(12) United States Patent
Musa et al.

(10) Patent No.: US 10,876,015 B2
(45) Date of Patent: Dec. 29, 2020

(54) COATING COMPOSITIONS FOR FORMING TONER COATINGS

(71) Applicant: ISP INVESTMENTS LLC, Wilmington, DE (US)

(72) Inventors: Osama M. Musa, Kinnelon, NJ (US); Drupesh Patel, Lake Hiawatha, NJ (US); Michael A. Tallon, Aberdeen, NJ (US); David K. Hood, Basking Ridge, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 207 days.

(21) Appl. No.: 15/775,972

(22) PCT Filed: Nov. 14, 2016

(86) PCT No.: PCT/US2016/061795
§ 371 (c)(1),
(2) Date: May 14, 2018

(87) PCT Pub. No.: WO2017/087308
PCT Pub. Date: May 26, 2017

(65) Prior Publication Data
US 2018/0327628 A1    Nov. 15, 2018

Related U.S. Application Data

(60) Provisional application No. 62/257,867, filed on Nov. 20, 2015.

(51) Int. Cl.
| C09D 139/04 | (2006.01) |
| C09D 4/00 | (2006.01) |
| C09D 7/20 | (2018.01) |
| C09J 139/04 | (2006.01) |
| C09D 7/63 | (2018.01) |
| B41M 5/52 | (2006.01) |

(52) U.S. Cl.
CPC ......... *C09D 139/04* (2013.01); *B41M 5/5254* (2013.01); *C09D 4/00* (2013.01); *C09D 7/20* (2018.01); *C09D 7/63* (2018.01); *C09J 139/04* (2013.01)

(58) Field of Classification Search
CPC .. C09D 139/04; C09D 139/06; C09D 133/14; B41M 5/5254
See application file for complete search history.

(56) References Cited

U.S. PATENT DOCUMENTS

| 2,882,262 | A | 4/1959 | Smith et al. | |
| 2010/0166985 | A1* | 7/2010 | Brockmeyer | C09D 133/14 428/32.1 |
| 2013/0150481 | A1* | 6/2013 | Hood | C08F 26/06 522/120 |
| 2013/0198968 | A1* | 8/2013 | Hood | C11D 3/0021 8/137 |
| 2013/0261268 | A1* | 10/2013 | Hood | C08F 226/06 525/326.9 |
| 2014/0296441 | A1* | 10/2014 | Hood | C08F 226/10 525/303 |

FOREIGN PATENT DOCUMENTS

WO    WO2014160672 A1    10/2014

OTHER PUBLICATIONS

SciFinder Search (May 07, 2020).*
International Search Report, PCT/US2016/061795 published on May 26, 2017.

* cited by examiner

*Primary Examiner* — Vu A Nguyen
(74) *Attorney, Agent, or Firm* — William J. Davis; Nathalie Tietcheu

(57) ABSTRACT

The present invention provides coating compositions for forming a toner coating and inkjet receptive coatings on a substrate containing a film forming polymer comprising (a) a monomer (monomer A) comprising at least one functionalized or unfunctionalized acryloyl moiety and at least one lactam moiety. (b) a N-vinyl amide monomer (monomer $B_{x1}$), (c) an optional cross-linker (monomer $B_{x2}$) and (d) a solvent. The coating compositions may further comprise an additional hydrophobic monomer moiety. The present invention further provides toner substrates and inkjet receptive substrates coated with the coating compositions.

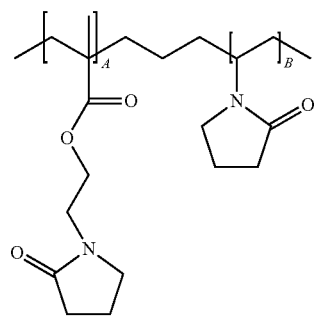

1 Claim, No Drawings

COATING COMPOSITIONS FOR FORMING TONER COATINGS

FIELD OF THE INVENTION

This invention provides coating compositions for forming toner coatings and inkjet receptive coatings on a substrate. This invention also provides substrates coated with the toner coatings and inkjet receptive coatings.

BACKGROUND OF THE INVENTION

Coating compositions for forming toner coatings and inkjet receptive coatings are successful methods for forming images on different substrates such as paper, polyester, metals, foils, vinyl, and canvas. However, printing onto substrates such as plastics, such as vinyl, polyester, and polyolefin has not attained the print quality, integrity, and adhesion commonly observed for paper substrates.

U.S. Pat. No. 2,882,262 A discloses that N-(acryloxyalkyl)- and N-(methacryl-oxyalkyl)-2-pyrrolidones can readily copolymerize with one or more other polymerizable unsaturated compounds including N-vinyl-2-pyrrolidone. However, the preparation and utility of copolymers derived from a residue of an acrylate, (meth)acrylate, or anhydride following reaction with an N-hydroxyalkyl lactam monomer, (b) a N-vinyl amide monomer, (c) an optional cross-linker is not disclosed.

U.S. Pat. No. 4,547,405 A discloses an ink jet recording sheet comprising a transparent support carrying a layer comprising 5-100% by weight of a coalesced block copolymer latex of polyvinyl alcohol with polyvinyl (benzyl ammonium chloride) and 0-95% by weight of a water-soluble polymer selected from the group consisting of polyvinyl alcohol, polyvinyl pyrrolidone and copolymers thereof. However, the preparation and utility of copolymers derived from a residue of an acrylate, (meth)acrylate, or anhydride following reaction with an N-hydroxyalkyl lactam monomer, (b) a N-vinyl amide monomer, (c) an optional cross-linker is not disclosed. The disclosure of which is hereby incorporated herein by reference in entirety.

U.S. Pat. No. 5,605,750 A discloses an opaque image-recording element for an ink-jet printer which comprises an opaque substrate having on at least one surface thereof a lower layer of a solvent-absorbing microporous material which comprises: (a) a matrix of substantially water-insoluble thermoplastic organic polymer; (b) finely divided substantially water-insoluble filler particles, of which at least 50 percent by weight are siliceous particles, the filler particles being distributed throughout the matrix and constituting from 40 to 90 percent by weight of the microporous material; (c) a network of interconnecting pores communicating substantially throughout the microporous material, the pores constituting from 35 to 95 percent by volume of the microporous material, and an upper image-forming layer of porous, pseudo-boehmite having an average pore radius of from 10 to 80 Å. However, the preparation and utility of copolymers derived from a residue of an acrylate, (meth)acrylate, or anhydride following reaction with an N-hydroxyalkyl lactam monomer, (b) a N-vinyl amide monomer, (c) an optional cross-linker is not disclosed.

US 2010/0166985 A1 discloses an aqueous dispersion of (meth)acrylic ester polymers comprising N-hydroxylated lactam units and its use in surface treatments of paper and paper products. However, the preparation and utility of copolymers comprising (a) a monomer composition derived from a residue of an acrylate, (meth)acrylate, or anhydride following reaction with an N-hydroxyalkyl lactam monomer, (b) a N-vinyl amide monomer, (c) an optional cross-linker is not disclosed.

WO 2011/112944 A1 discloses a polymer poly(N-vinyl-2-pyrrolidone)-co-(N-(methacryloyloxyethyl)pyrrolidin-2-one) and its use as a functional additive in cleansing compositions. Its utility in printing applications is not disclosed.

United States Patent Application Publications US 2007/0092666 and US 2007/0092668 disclose coating compositions for forming ink jet-receptive coatings on a substrate. U.S. Pat. No. 8,198,353 B2 and U.S. Pat. No. 5,789,123 disclose coating compositions for forming liquid toner coatings on a substrate. International Publication Number WO 2005/115763 A1 discloses coating compositions for forming liquid toner coatings on a substrate. However, the preparation and utility of copolymers comprising (a) a monomer composition derived from a residue of an acrylate, (meth)acrylate, or anhydride following reaction with an N-hydroxyalkyl lactam monomer, (b) a N-vinyl amide monomer, (c) an optional cross-linker is not disclosed.

Accordingly, there is a need for improved toner coatings and inkjet receptive coatings, which exhibit improved properties including the ability to absorb and retain the ink effectively in both solvent-based and water-based ink printable forms. There is also a need to provide substrates which are coated with coating compositions that are both solvent-based and water-based ink printable.

SUMMARY OF THE INVENTION

The present invention provides coating compositions for forming a toner coating on a substrate containing a film forming polymer derived from: (a) a monomer composition (monomer A) comprising at least one functionalized or unfunctionalized acryloyl moiety and at least one lactam moiety, (b) at least one N-vinyl amide monomer (monomer $B_{X1}$), (c) at least one optional cross-linker (monomer $B_{X2}$) and (d) at least one solvent.

Further, the film forming polymer finds utility as an additive in non-limiting examples of compositions including personal care compositions, coating compositions, household, industrial and institutional compositions, pharmaceutical compositions, food compositions, cementing fluids, oilfield compositions, construction compositions, servicing fluids, gravel packing muds, fracturing fluids, completion fluids, workover fluids, spacer fluids, drilling muds, biocides, adhesives, inks, papers, polishes, membranes, metal working fluids, plastics, textiles, printing compositions, lubricants, preservatives, agrochemicals, and wood-care compositions.

In another embodiment there is provided for a film forming polymer derived from: (a) a monomer comprising at least one functionalized or unfunctionalized acryloyl moiety and at least one lactam moiety, (b) at least one N-vinyl amide monomer, (c) at least one optional cross-linker and (d) at least one solvent, having a solids content of about 15-50% and a viscosity of about 200-60000 cps.

In another embodiment there is provided for a dried film forming polymer derived from: (a) a monomer comprising at least one functionalized or unfunctionalized acryloyl moiety and at least one lactam moiety, (b) at least one N-vinyl amide monomer, (c) at least one optional cross-linker and (d) at least one solvent, having a glass transition temperature ($T_g$) of about 70-170° C.

The present invention further provides toner and inkjet receptive substrates coated with the coating composition.

DETAILED DESCRIPTION OF THE INVENTION

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

This invention provides coating compositions for forming toner coatings and inkjet receptive coatings on a substrate. This invention also provides substrates coated with the toner coatings and inkjet receptive coatings.

All patents, published patent applications, and non-patent publications referenced in any portion of this application, the disclosure of which is hereby incorporated herein by reference in its entirety.

All of the articles and/or methods disclosed herein can be made and executed without undue experimentation in light of the present disclosure. While the articles and methods of the disclosed and/or claimed inventive concept(s) have been described in terms of particular aspects, it will be apparent to those of ordinary skill in the art that variations may be applied to the articles and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

As utilized in accordance with the disclosure, the following terms, unless otherwise indicated, shall be understood to have the following meanings.

As used herein, the following terms have the meanings set out below.

The term "acidic conditions" refers to conditions relating to the pH value of an aqueous solution. Pure water is considered to be neutral, with a pH close to 7.0 at 25° C. Solutions with a pH value less than 7 are considered to be acidic solutions.

The term "basic conditions" refers to conditions relating to the pH value. Pure water is considered to be neutral, with a pH close to 7.0 at 25° C. Solutions with a pH value greater than 7 are considered to be basic or alkaline.

The term "branched and unbranched alkyl groups" refers to alkyl groups, which may be straight chained or branched. For example, the alkyl groups have from 1 to about 18 carbon atoms, more particularly, from 1 to about 10 carbon atoms, and yet more particularly from 1 to about 6 carbon atoms. Branched groups include isopropyl, tert-butyl, and the like.

The term "copolymer" refers to chains comprising more than one type of monomer unit.

The term "halogen" refers to chloro, bromo, iodo and fluoro, and in one embodiment, is bromo and/or chloro.

The term "heteroatom" refers to atoms such as oxygen, nitrogen, sulfur, and phosphorous. When the heteroatom is a nitrogen atom, the nitrogen atom may be present in the form of a quaternary amine.

The term "mineral acid" refers to an acid derived from one or more inorganic compounds. Mineral acids release hydrogen ions when dissolved in water. Commonly used mineral acids are sulfuric acid, hydrochloric acid, and nitric acid.

The term "monomer" refers to the repeat units comprising a polymer. A monomer is a small molecule that chemically bonds to other monomers to form a polymer.

The term "pH" refers to a measure of the acidity or basicity of an aqueous solution. Pure water is considered to be neutral, with a pH close to 7.0 at 25° C. Solutions with a pH less than 7 are considered to be acidic and solutions with a pH greater than 7 are considered to be basic or alkaline.

The term "film forming" refers to the capability of a substance to form, or evolve into a structure, that is primarily, but not necessarily, a continuous thin sheet of said substance which may or may not be in contact with a substrate. For example, a 10% aqueous solution of poly (vinyl pyrrolidone) (PVP K-90), when cast with a #38 Meyer rod onto a substrate (i.e. Melinex film), exhibits film formation upon drying (evaporation of water). Film formation is functional component to forming a coating.

The term "polymerization" refers to methods for chemically reacting monomer compounds to form polymer chains. The polymer chain may be alternating, branched, blocked, or random. The type of polymerization method may be selected from a wide variety of methods. Such methods include, but are not limited to, free radical polymerization methods, such as classical radical polymerization and controlled radical polymerization, Nitroxide Mediation Polymerization (NMP), Atom Transfer Radical Polymerization (ATRP), and Reversible Addition Fragmentation Chain-Transfer (RAFT).

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or."

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, $B_{Xn}$, $B_{Xn+1}$, or combinations thereof" is intended to include at least one of: A, $B_{Xn}$, $B_{Xn+1}$, $AB_{Xn}$, A $B_{Xn+1}$, $B_{Xn}B_{Xn+1}$, or $AB_{Xn}B_{Xn+1}$ and, if order is important in a particular context, also $B_{Xn}A$, $B_{Xn+1}A$, $B_{Xn+1}B_{Xn}$, $B_{Xn+1}B_{Xn}A$, $B_{Xn}B_{Xn+1}A$, $AB_{Xn+1}B_{Xn}$, $B_{Xn}AB_{Xn+1}$, or $B_{Xn+1}AB_{Xn}$. Continuing with this example, expressly included are combinations that contain repeats of one or more item or term, such as $B_{Xn}B_{Xn}$, AAA, $MB_{Xn}$, $B_{Xn}B_{Xn}B_{Xn+1}$, $AAAB_{Xn}B_{Xn+1}B_{Xn+1}B_{Xn+1}B_{Xn+1}$, $B_{Xn+1}B_{Xn}B_{Xn}AAA$, $B_{Xn+1}AB_{Xn}AB_{Xn}B_{Xn}$ and so forth. The skilled artisan will understand that typically there is no limit on the number of items or terms in any combination, unless otherwise apparent from the context.

The term "each independently selected from the group consisting of" means when a group appears more than once in a structure, that group may be selected independently each time it appears.

The term "hydrocarbyl" includes straight-chain and branched-chain alkyl, alkenyl, alkynyl, cycloalkyl, cycloalkenyl, aryl groups, and combinations thereof with optional heteroatom(s). A hydrocarbyl group may be mono-, di- or polyvalent.

The term "alkyl" refers to a functionalized or unfunctionalized monovalent straight-chain, branched-chain or cyclic $C_1$-$C_{60}$ group optionally having one or more heteroatoms. Particularly, an alkyl is a $C_1$-$C_{45}$ group and more particularly, a $C_1$-$C_{30}$ group. Particular, yet non-limiting examples of alkyl groups include methyl, ethyl, n-propyl, isopropyl, n-butyl, isobutyl, tert-butyl, cyclobutyl, n-pentyl, isopentyl, cyclopentyl, n-hexyl, cyclohexyl, n-heptyl, cyclyheptyl, methylcyclohexyl, n-octyl, 2-ethylhexyl, tert-octyl, iso-norbornyl, n-dodecyl, tert-dodecyl, n-tetradecyl, n-hexadecyl, n-octadecyl, and n-eicosyl.

The term "alkylene" refers to a functionalized or unfunctionalized divalent straight-chain, branched-chain or cyclic $C_1$-$C_{40}$ group optionally having one or more heteroatoms. Particularly, an alkylene is a $C_1$-$C_{45}$ group and more particularly, a $C_1$-$C_{30}$ group. Particular, yet non-limiting examples of alkylene groups include —$CH_2$—. —$CH_2$—$CH_2$—, —$CH(CH_3)$—$CH_2$—, —$CH_2$—$CH(CH_3)$—, —$C(CH_3)_2$—$CH_2$—, —$CH_2$—$C(CH_3)_2$—, —$CH(CH_3)$—$CH(CH_3)$—, —$C(CH_3)_2$—$C(CH_3)_2$—, —$CH_2$—$CH_2$—$CH_2$—, —$CH(CH_3)$—$CH_2$—$CH_2$—, —$CH_2$—$CH(CH_3)$—$CH_2$—, —$CH_2$—$CH_2$—$CH(CH_3)$—, —$CH_2$—$CH_2$—$CH_2$—$CH_2$, —$H_2$—$H_2$—$H_2$—$H_2$—, —$CH_2$—$CH_2$—$H_2$—$H_2$—$CH_2$—$CH_2$—$CH_2$—, —$CH_2$—$CH_2$—$CH_2$—$CH_2$—$CH_2$—$CH_2$—, —$CH_2$—$CH_2$—$CH_2$—$CH_2$—$CH_2CH_2$—$CH_2$—, cyclopropylene, cyclobutylene, cyclopentylene, cyclohexylene, and the like.

The term "heteroatom" refers to oxygen, nitrogen, sulfur, silicon, phosphorous, and/or halogen. The heteroatom(s) may be present as a part of one or more heteroatom-containing functional groups and/or as a part of one or more heterocyclic rings. Non-limiting examples of heteroatom-containing functional groups include ether, hydroxy, epoxy, carbonyl, carboxamide, carboxylic ester, carboxylic acid, imine, imide, amine, sulfonic, sulfonamide, phosphonic, and silane groups.

The term "metal ion" includes alkali metal ions, alkaline earth metal ions, and transition metal ions. For example, sodium, calcium, copper and iron derived ions.

The term "ammonium" includes protonated $NH_3$ and protonated primary, secondary, and tertiary organic amines.

The term "functionalized" refers to the state of a moiety that has one or more functional groups introduced to it by way of one or more functionalization reactions known to a person having ordinary skill in the art. Particular, yet non-limiting examples of functionalization reactions include epoxidation, sulfonation, hydrolysis, amidation, esterification, hydroxylation, dihyroxylation, amination, ammonolysis, acylation, nitration, oxidation, dehydration, elimination, hydration, dehydrogenation, hydrogenation, acetalization, halogenation, dehydrohalogenation, Michael addition, aldol condensation, Canizzaro reaction, Mannich reaction, Clasien condensation, Suzuki coupling, and the like. Particularly, functionalization of a moiety replaces one or more hydrogens in the moiety with one or more non-hydrogen groups, for e.g., alkyl, alkoxyl, cycloalkyl, alkenyl, cycloalkenyl, alkynyl, and/or aryl groups. Particular, yet non-limiting examples of cycloalkyl groups include cyclopentane, cyclohexane, cycloheptane, and the like. Particular, yet non-limiting examples of alkoxy groups include methoxy, ethoxy, n-propoxy, isopropoxy, and the like. Particular, yet non-limiting examples of aryl groups include benzenes, naphthalenes (2 rings), anthracenes (3 rings), and the like.

The term "residue of" refers to a fragment of a reactant that remains after a reaction with another reactant(s). The residue may be mono-, di- or polyvalent.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues. The polymer may have a random, block, and/or alternating architecture.

The term "homopolymer" refers to a polymer that consists essentially of a single monomer type.

The term "non-homopolymer" refers to a polymer that comprises more than one monomer types.

The term "copolymer" refers to a non-homopolymer that comprises two different monomer types.

The term "terpolymer" refers to a non-homopolymer that comprises three different monomer types.

The term "branched" refers to any non-linear molecular structure. The term includes both branched and hyperbranched structures.

The term "free radical addition polymerization initiator" refers to a compound used in a catalytic amount to initiate a free radical addition polymerization. The choice of initiator depends mainly upon its solubility and its decomposition temperature.

The term "alkyl (alk) acrylate" refers to an alkyl ester of an acrylic acid or an alkyl acrylic acid.

The term "alkyl (alk) acrylamide" refers to an alkyl amide of an acrylic acid or an alkyl acrylic acid.

The term "acryloyl" refers to a moiety having the generic structure:

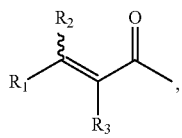

wherein each $R_1$, $R_2$, and $R_3$ is independently selected from the group consisting of hydrogen and functionalized and unfunctionalized alkyl, alkenyl, aryl, nitrile, formyl, carboxyl, carboxylate salt, carboxylic ester, carboxamide, halogen, thiocarboxylate, and combinations thereof.

The term "non-aqueous" refers to a state of not being aqueous in nature.

By "non-aqueous" it is generally meant that water is not deliberately added to the composition in any significant quantity. However, the term "non-aqueous" does not mean that small amounts of water cannot be present, for example as a consequence of its association with hygroscopic raw materials. Accordingly, for the purposes of this invention, the term "non-aqueous" generally means that water is present in an amount no greater than about 5%, more preferably no greater than about 3% by weight based on the total weight of the composition.

In a first embodiment, the present invention provides coating compositions for forming a toner coating on a substrate containing a film forming polymer comprising: (a) a monomer comprising at least one functionalized or unfunctionalized acryloyl moiety and at least one lactam moiety (monomer A), (b) a N-vinyl amide monomer (monomer $B_{X1}$), (c) an optional cross-linker (monomer $B_{X2}$) and (d) a solvent.

Preferably, the monomer (monomer A) comprising at least one functionalized or unfunctionalized acryloyl moiety and at least one lactam moiety has a structure:

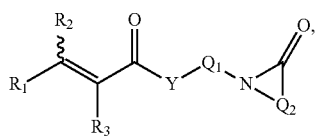
(1)

wherein each $R_1$ $R_2$ and $R_3$ is independently selected from the group consisting of hydrogen, halogens, functionalized and unfunctionalized $C_1$-$C_4$ alkyl, and

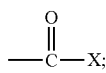

each X is independently selected from the group consisting of $OR_4$, OM, halogen, $N(R_5)(R_6)$,

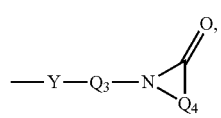

and combinations thereof; each Y is independently oxygen, $NR_7$ or sulfur; each $R_4$, $R_5$, $R_6$ and $R_7$ is independently selected from the group consisting of hydrogen and functionalized and unfunctionalized alkyl; each M is independently selected from the group consisting of metal ions, ammonium ions, organic ammonium cations, and combinations thereof; and each $Q_1$, $Q_2$, $Q_3$, and $Q_4$ is independently selected from the group consisting of functionalized and unfunctionalized alkylene.

Preferably, each $Q_1$, $Q_2$, $Q_3$, and $Q_4$ is independently selected from the group consisting of functionalized and unfunctionalized $C_1$-$C_{12}$ alkylene. Particular, yet non-limiting examples of alkylene groups include —$CH_2$—, —$CH_2$—$CH_2$—, —$CH(CH_3)$—$CH_2$—, —$CH_2$—$CH(CH_3)$—, —$C(CH_3)_2$—$CH_2$—, —$CH_2$—$C(CH_3)_2$—, —$CH(CH_3)$—$CH(CH_3)$—, —$C(CH_3)_2$—$C(CH_3)_2$—, —$CH_2$—$CH_2$—$CH_2$—, —$CH(CH_3)$—$CH_2$—$CH_2$—, —$CH_2$—$CH(CH_3)$—$CH_2$—, —$CH_2$—$CH_2$—$CH(CH_3)$—, —$CH_2$—$CH_2$—$H_2$—$H_2$—, —$CH$—$CH_2$—$CH_2$—$CH_2$—$CH_2$—, —$CH_2$—$CH_2$—$CH_2$—$CH_2$—$CH_2$—$CH_2$—, and —$CH$—$CH_2$—$CH_2$—$CH_2$—$CH$—$CH_2$—$CH_2$—.

In one non-limiting embodiment, each $R_1$, $R_2$ and $R_3$ is independently selected from the group consisting of hydrogen, methyl and combinations thereof. Particularly, $R_1$ and $R_2$ are hydrogens and $R_3$ is hydrogen or methyl.

In another non-limiting embodiment, each $R_1$ and $R_3$ is independently hydrogen or methyl; $R_2$ is

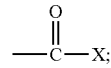

X is selected from the group consisting of $OR_4$, OM, halogens, and $N(R_5)(R_6)$; each $R_4$, $R_5$, and $R_6$ is independently selected from the group consisting of hydrogen and functionalized and unfunctionalized alkyl; and each M is independently selected from the group consisting of metal ions, ammonium ions, organic ammonium cations, and combinations thereof. Particularly, $R_1$ and $R_3$ are hydrogens and $R_2$ is

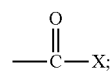

X is selected from the group consisting of $OR_4$, OM and $N(R_5)(R_6)$; each $R_4$, $R_5$, and $R_6$ is independently selected from the group consisting of hydrogen and functionalized and unfunctionalized $C_1$-$C_4$ alkyl; and each M is independently selected from the group consisting of metal ions, ammonium ions, organic ammonium cations, and combinations thereof.

The first polymerizable unit, defined by structure (1), maybe be synthesized using methods recorded in the art, e.g., by reaction of an N-hydroxylalkyl lactam with an acrylate, (meth)acrylate, anhydride, or similar compounds. Production methods include those described in patents: U.S. Pat. Nos. 2,882,262; 5,523,340; 6,369,163; U.S. Patent Application Publication 2007/123673; GB 924,623; 930, 668; and 1,404,989; WO 03/006569; and EP 385918. Each of the previous disclosures are hereby incorporated herein by reference in its entirety.

The lactam-containing monomers shown in structures (2)-(57) can be obtained from condensation reactions that include an N-hydroxyalkyl lactam and an unsaturated carboxylic acid, an acrylate, a (meth)acrylate, or an anhydride. Suitable N-hydroxyalkyl lactams include N-hydroxymethyl pyrrolidone and caprolactam, N-hydroxyethyl pyrrolidone and caprolactam, and N-hydroxypropyl pyrrolidone and caprolactam. Non-limiting examples of carboxylic acids that can be used include: acrylic acid, methacrylic acid, itaconic acid, crotonic acid, fumaric acid, succinic acid, and maleic acid. Similarly, acrylates and (meth)acrylates include (without limitation) methyl, ethyl, butyl, octyl, ethyl hexyl acrylates and their (meth)acrylate analogues. Representative anhydrides include formic anhydride, succinic anhydride, maleic anhydride and acetic anhydride.

In particular embodiments, the monomer (monomer A) having at least one functionalized or unfunctionalized acryloyl moiety and at least one lactam moiety has a structure selected from the group consisting of:

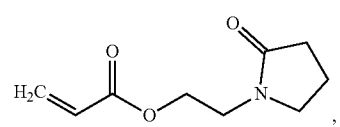
(2)

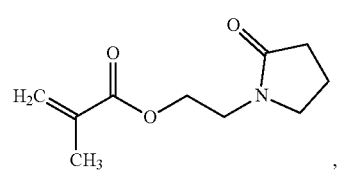
(3)

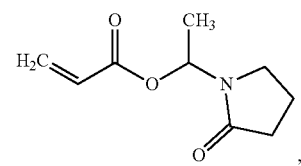
(4)

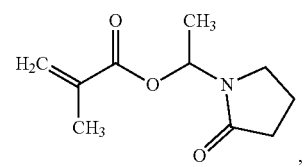
(5)

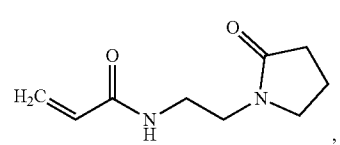
(6)

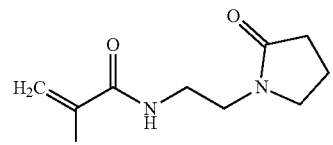
(7)

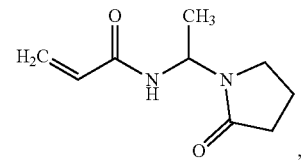
(8)

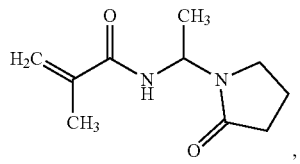
(9)

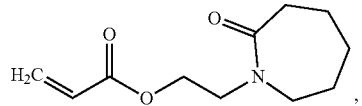
(10)

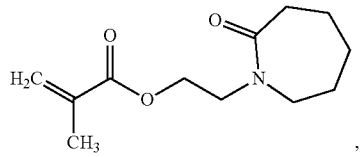
(11)

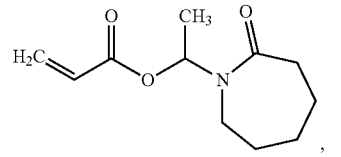
(12)

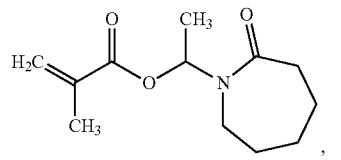
(13)

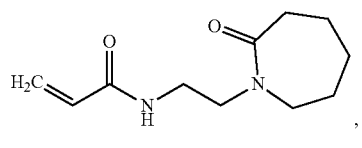
(14)

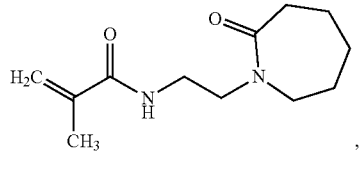
(15)

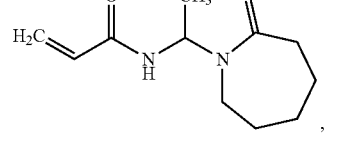
(16)

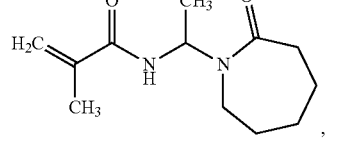
(17)

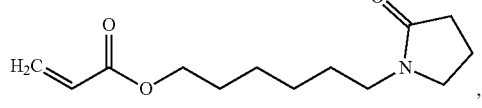
(18)

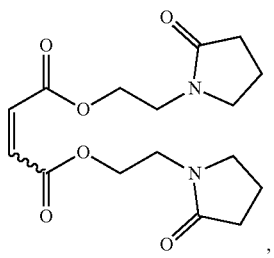 (34)
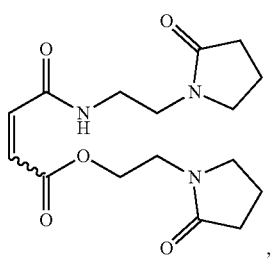 (35)
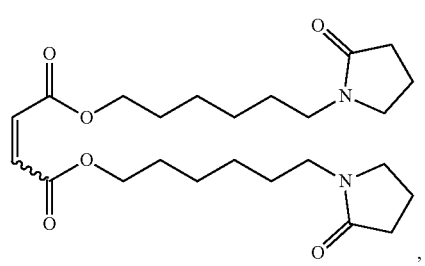 (36)
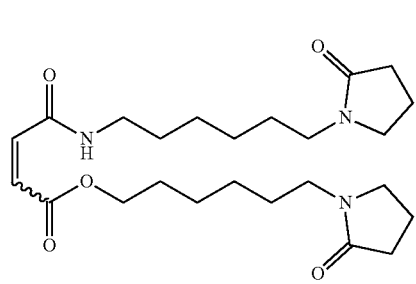 (37)
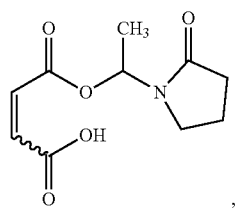 (38)
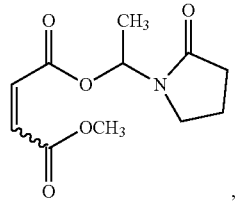 (39)
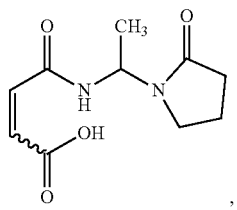 (40)
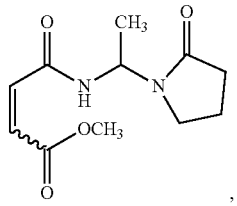 (41)
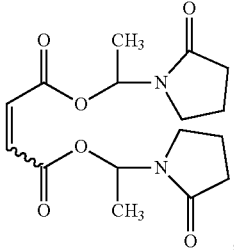 (42)
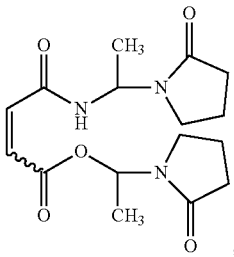 (43)
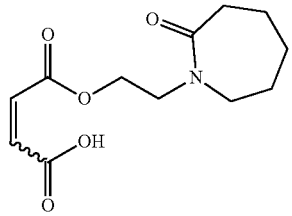 (44)
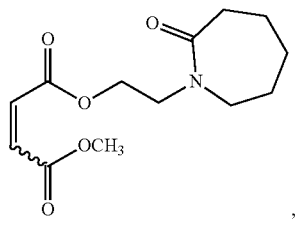 (45)

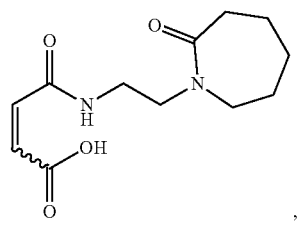
(46)

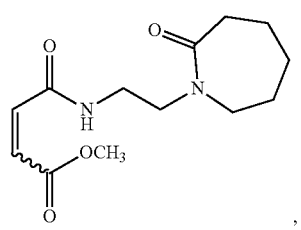
(47)

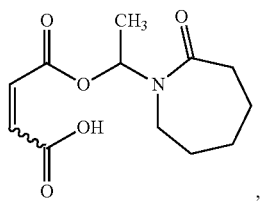
(48)

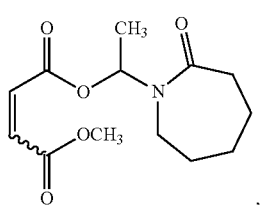
(49)

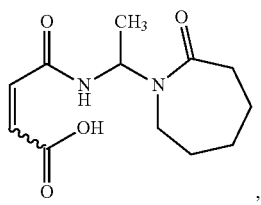
(50)

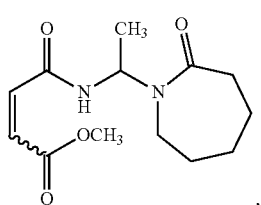
(51)

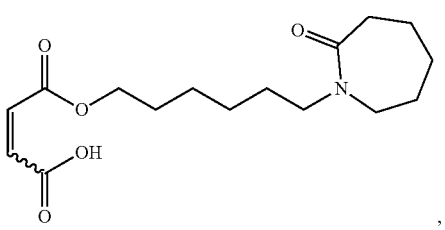
(52)

(53)
(54)
(55)
(56)
, and
(57)

Other suitable examples of can be found in WO 2011/063208, the disclosure of which is hereby incorporated herein by reference in its entirety.

Preferably, (a) a monomer composition (monomer A) is derived from a residue of an acrylate, (meth)acrylate, or anhydride following reaction with an N-hydroxyalkyl lactam monomer resulting in the formation of 1-(2-ethyl-2-pyrrolidone)methacrylate, pyrrolidonoethyl methacrylate, N-(methacryloyloxyethyl)pyrrolidin-2-one, hydroxyethylpyrrolidone methacrylate, pyrrolidonoethyl acrylate, N-(acryloyloxyethyl)pyrrolidin-2-one, 1-(2-ethyl-2-caprolactam)methacrylate, N-(methacryloyloxyethyl)caprolactam, hydroxyethylcaprolactam methacrylate, N-(acryloyloxyethyl)caprolactam and the like as described in WO 2011/063208 A1 (document incorporated by reference in its entirety). More preferably, (a) a monomer composition (monomer A) is derived from a residue of an acrylate, (meth)acrylate, or anhydride following reaction with an N-hydroxyalkyl lactam monomer resulting in the formation of N-(acryloyloxyethyl)pyrrolidin-2-one and N-(methacryloyloxyethyl)pyrrolidin-2-one.

Suitable N-vinyl amide monomers (monomer $B_{X1}$) include N-vinyl-2-pyrrolidone, N-vinyl caprolactam, N-vinyl-3-butyl pyrrolidone, N-vinyl-5-methyl-5-ethyl pyrrolidone, N-vinyl-3,3,5-trimethyl pyyrolidone, N-vinyl-6-butyl piperidone, N-vinyl-7-ethyl caprolactam, N-vinyl-3,5-dimethyl caprolactam, N-vinyl-4-isopropyl caprolactam, N-vinyl-3,5,7-trimethyl caprolactam, N-vinyl-5,5-dimethyl pyrrolidone, N-vinyl-5,5-diethyl pyrrolidone and N-vinyl-5-methyl-5-ethyl pyrrolidone; N-vinyl piperidone, N-vinyl-6,6-dimethyl piperidone, N-vinyl-6-methyl-6-ethyl piperidone, N-vinyl-6,6-dimethyl piperidone, N-vinyl-6,6-diethyl piperidone and N-vinyl-6-methyl-6-ethyl piperidone; N-vinyl-7-methyl caprolactam, N-vinyl-7,7-dimethyl caprolactam, N-vinyl-7-ethyl caprolactam, N-vinyl-7,7-diethyl caprolactam and N-vinyl-7-methyl-7-ethyl caprolactam, as described in U.S. Pat. Nos. 2,265,450; 2,317,804; 2,335,454; and 3,423,381. The four patent documents above, the disclosure of which is hereby incorporated herein by reference in its entirety.

Additional examples of suitable lactamic monomers (monomer $B_{X1}$) are disclosed in "A novel route to substituted poly(vinyl pyrrolidone)s via simple functionalization of 1-vinyl-2-pyrrolidone in the 3-position by ring-opening reactions" by H. Reinecke et. al. (*Eur. Poly. J.*, 46 (2010) p 1557-1562) and "Synthesis and polymerization of new pyrrolidone-containing methacrylate monomers" by T. P. Davis et. al. (*Polymer*, 39, 17, p 4165-4169, 1998). Background on the chemistry, structure, and properties of lactamic polymers can be found in "N-Vinyl Amide Polymers" by E. S. Barabas (*Encyclopedia of Polymer Science and Engineering*, 17, $2^{nd}$ ed., p 198-257, (1989)) and in "Polymers of N-Vinylpyrrolidone: Synthesis, Characterization and Uses" by F. Haaf, A. Sanner, and F. Straub (*Polymer Journal*, 17, 1, p 143-152 (1985)). The disclosures of which are hereby incorporated herein by reference in their entirety.

Suitable solvents in the coating compositions comprise aqueous and non-aqueous solvents. Illustrative non-limiting examples of solvents include water, ethanol, isopropanol, butanol, acetone, methyl ethyl ketone, ethyl acetate, and mixtures thereof.

Preferably, (a) is 0.1-95%, (b) is 1-95%, (c) is 0 to 5% and (d) is to 100%, by weight. More preferably, (a) is 1-85%, (b) is 1-85%, (c) is 0 to 2.5% and (d) is to 100%, by weight. Most preferably, (a) is 1-75%, (b) is 1-75%, (c) is 0 to 1.25% and (d) is to 100%, by weight.

Preferably, the polymer is poly(N-(2-methacryloyloxyethyl) pyrrolidone-co-N-vinyl-2-pyrrolidone), poly(N-(2-methacryloyloxyethyl) pyrrolidone-co-N-vinyl caprolactam), poly(N-(2-methacryloyloxyethyl) caprolactam-co-N-vinyl-2-pyrrolidone), poly(N-(2-methacryloyloxyethyl) caprolactam-co-N-vinyl caprolactam), poly(N-(2-acryloyloxyethyl) pyrrolidone-co-N-vinyl-2-pyrrolidone), poly(N-(2-acryloyloxyethyl) pyrrolidone-co-N-vinyl caprolactam), poly(N-(2-acryloyloxyethyl) caprolactam-co-N-vinyl-2-pyrrolidone), or poly(N-(2-acryloyloxyethyl) caprolactam-co-N-vinyl caprolactam).

In another aspect, the polymer further comprises an optional cross-linker monomer moiety. Examples of cross-linkers include at least two ethylenically unsaturated double bonds are compounds having two or more moieties selected from the group consisting of functionalized and unfunctionalized acryloyloxy, methacryloyloxy, acryloylamino, methacryloylamino, alkenyl, vinyl, allyl, methallyl, and combinations thereof. Particularly, these crosslinkers are obtained by functionalization of parent compounds having at least two reactive groups such as hydroxyl, amino, and/or sulfhydryl groups. Examples (monomer $B_{X2}$) include 1,3-divinyl imidazolidin-2-one, pentaerythritol triallyl ether, pentaerythritol triacrylate, N,N'-methylene bis(acrylamide), and the like.

The toner coatings may be in the form of a liquid, solid, or wax. Preferably, the toner coatings are in the form of a liquid In another aspect, the invention provides a toner substrate coated with a coating composition containing a film forming polymer comprising: (a) a monomer composition (monomer A) comprising at least one functionalized or unfunctionalized acryloyl moiety and at least one lactam moiety, (b) at least one N-vinyl amide monomer (monomer $B_{X1}$), (c) at least one optional cross-linker (monomer $B_{X2}$) and (d) at least one solvent.

In another aspect, the invention provides a flexible food package substrate coated with a coating composition containing a film forming polymer comprising: (a) a monomer composition (monomer A) comprising at least one functionalized or unfunctionalized acryloyl moiety and at least one lactam moiety, (b) at least one N-vinyl amide monomer (monomer $B_{X1}$), (c) at least one optional cross-linker (monomer $B_{X2}$) and (d) at least one solvent.

Preferably, (a) is a monomer (monomer A) comprising at least one functionalized or unfunctionalized acryloyl moiety and at least one lactam moiety is selected from the group consisting of 1-(2-ethyl-2-pyrrolidone)methacrylate, pyrrolidonoethyl methacrylate, N-(methacryloyloxyethyl)pyrrolidin-2-one, hydroxyethylpyrrolidone methacrylate, pyrrolidonoethyl acrylate, N-(acryloyloxyethyl)pyrrolidin-2-one, 1-(2-ethyl-2-caprolactam)methacrylate, N-(methacryloyloxyethyl)caprolactam, hydroxyethylcaprolactam methacrylate, N-(acryloyloxyethyl)caprolactam and the like. More preferably, (a) a monomer composition (monomer A) is derived from a residue of an acrylate, (meth)acrylate, or anhydride following reaction with an N-hydroxyalkyl lactam monomer is 1-(2-ethyl-2-pyrrolidone)methacrylate and 1-(2-ethyl-2-pyrrolidone)acrylate.

Suitable solvents in the coating compositions comprise aqueous and non-aqueous solvents. Illustrative non-limiting examples of solvents include water, ethanol, isopropanol, butanol, acetone, methyl ethyl ketone, ethyl acetate, and mixtures thereof.

The present invention further provides toner substrates and inkjet receptive substrates with the coating compositions.

Polymeric binders, also referred to as emulsions, latexes, adhesives, glues, dispersions, or resins, are versatile systems in the construction and design of polymers. Examples of suitable binder classes include styrene butadiene rubber (SBR) latex, styrene acrylate, polyvinyl alcohol and copolymers, polyvinyl acetate copolymers, vinyl acetate copolymers, carboxylated SBR latex, polyolefins and copolymer of polyolefins (i.e.; poly(ethylene-co-acrylic acid) and poly(ethylene-co-vinyl acetate)), styrene acrylate copolymers, styrene/butadiene/acrylonitrile, styrene/butadiene/acrylate/acrylonitrile, polyalkylene imines, polyvinyl pyrrolidone and copolymers, polyurethanes, cationic polyurethanes, polyamines, polyamides, cationic polyurethanes, polyethylene oxide, poly(2-ethyl-2-oxazoline), polyester resins, gelatins, casein, alginate, cellulose derivatives, hydroxyethyl cellulose, ethyl cellulose, hydroxypropyl cellulose, starches, ethoxylated, oxidized and enzyme converted starches, cationic starches, guar, cationic guar, water soluble gums, acrylic vinyl polymers, soy protein polymers as well as mixtures of water soluble and water-insoluble resins, latexes may be used. Latex binders are most commonly emulsions (polymer particles suspended in a liquid medium).

Preferably a pigment or pigments (colorant or colorants) are used in the coating compositions of the invention. Suitable pigment materials are described in Hunger's "Industrial Organic Pigments," Itoh's "Dictionary of Pigments," and Leach and Pierce's "Printing Ink Manual." Pigment can be added by mixing components. Pigment or pigments may be added with a plasticizer and/or a filler. The exact choice and amount of pigment will depend upon the final desired coating composition and such information is well known in the art.

The electrophotographic process is disclosed in "Effect of Toner Fixing Temperature on Print Properties in the Electrophotographic Process" by T. Hartus (*TAGA Journal*, 4, 2008, 165-177). The adhesion science of toner is disclosed in "Adhesion of Electrophotographic Toner on Paper" by T. Hartus (*Graphic Arts in Finland* 30, 2001, 3). Information related to the electrophotographic process as well as liquid and dry toner materials can be found in "Handbook of Imaging Materials" by A. S. Diamond and D. S. Weiss (ed.) (Marcel Dekker, 2002). Preferably, the toner receptive coating is suitable for fusing to toner at temperatures between 50° C. and 175° C.

Preferably a surfactant is used in the coating compositions of the invention. Surfactants (wetting agents) are compounds that lower the surface tension of a liquid, the interfacial tension between two liquids, or that between a liquid and a solid. Surfactants may act as detergents, emulsifiers, foaming agents, and dispersants. Surfactants are usually organic compounds that are amphiphilic, meaning they contain both hydrophobic groups and hydrophilic groups. Therefore, a surfactant contains both a water-insoluble (or oil-soluble) component and a water-soluble component. Surfactants will diffuse in water and adsorb at interfaces between air and water or at the interface between oil and water, in the case where water is mixed with oil. The insoluble hydrophobic group may extend out of the bulk water phase, into the air or into the oil phase, while the water-soluble head group remains in the water phase. This alignment of surfactants at the surface modifies the surface properties of water at the water/air or water/oil interface. The exact choice and amount of surfactant will depend upon the final desired coating composition and such information is well known in the art.

Other suitable components for aqueous based coatings of this invention include silicates and silica gels, free radical initiators, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latexes, acrylic latexes, polyalkylene glycols, maleic anhydride-co-methyl vinyl ether polymers, polyalkylene imines, oxetanes, oxazolines, benzoxazines, polydi allyldialkylammonium chloride materials, starch, acrylated epoxides, glycidyl acrylate monomers, polyurethanes, acrylated oligomers of polyurethanes, acrylated glycidyl oligomers, polyfunctional acrylates, polyfunctional aziridines, clays, calcium carbonates, talcs, cellulosics, cycloaliphatic epoxides, vinyl ethers, epoxy based dispersions, anionic surfactants (i.e., sodium lauryl sulfate), non-ionic surfactants, cationic surfactants, silanes or silicone based polymers, and anionic polyacrylates, such as polyacrylic acid. Optional components in the composition for optimization of the coating composition when coated on different substrates include pigments, clays, e.g. organoclays and water-swellable clays, acrylic polymers, acrylic copolymers, alginates, carrageenan, microcrystalline cellulose, gelatin, carboxymethylcellulose sodium, hydroxyethylcellulose, hydroxypropylcellulose, hydroxypropylmethylcellulose, methylcellulose, guar and guar derivatives, locust bean gum, polyethylene oxide, polyvinylpyrrolidones, copolymers of polyvinylpyrrolidones, polyvinylalcohols, charge control agents, optical brighteners, other water soluble polymers, silicas, aluminates, zirconates, calcium carbonates, xanthan gums, polymers or copolymers of water soluble vinyl lactams optionally having in situ-formed particles of crosslinked vinyl lactam polymers or copolymers, crosslinked polyvinyl pyrrolidone, and crosslinkers to achieve advantageous printable surface coatings having light stability (see U.S. Pat. No. 6,872,787 B2). Preferred components and optimal amounts of these components will depend upon the specific support coating and application and can be readily determined by one of ordinary skill in the art.

According to one embodiment of the present invention, a solvent may be added. Suitable solvents are described in the "*Industrial Solvents Handbook*, 4$^{th}$ Edition" edited by E. W. Flick (Noyes Data Corporation, Park Ridge, N.J., 1991), which disclosure is incorporated by reference herein. For additional consideration of solvents, useful information is described in "*Polymer Handbook*, 4$^{th}$ Edition," edited by J. Brandrup et. al. (J. Wiley and Sons, New York, 1999), which disclosure is incorporated by reference herein. A solvent is a substance that dissolves a solute resulting in a solution. In solution, all of the ingredients are uniformly distributed at a molecular level and no residue remains. The mixing is referred to as miscibility, whereas the ability to dissolve one compound into another is known as solubility. However, in addition to mixing, both substances in the solution interact with each other. Solvents can be broadly classified into two categories: polar and non-polar. The polarity, dipole moment, polarizability and hydrogen bonding of a solvent determines what type of compounds it is able to dissolve and with what other solvents or liquid compounds it is miscible. Polar solvents dissolve polar compounds best and non-polar solvents dissolve non-polar compounds best: Strongly polar compounds like sugars (e.g., sucrose) or ionic compounds, like inorganic salts (e.g., table salt) dissolve only in very polar solvents like water, while strongly non-polar compounds like oils or waxes dissolve only in very non-polar organic solvents like hexane. Similarly, water and hexane (or vinegar and vegetable oil) are not miscible with each other.

The coating compositions of the invention can provide a glossy, transparent to matte, opaque finish coating on synthetic films such as polyester, metals, vinyl, polyolefins, and the like, as well as paper and canvas.

Generally, the inventive film forming polymer and a solvent, having a solids content of about 15 to 50%, exhibits a viscosity of about 200 to 60,000 cps.

Generally, the dried inventive film forming polymer and solvent are capable of having a glass transition temperature ($T_g$) of about 70 to 170° C.

Generally, the coating composition has a solid content of about a solids content of about 15-50% and a viscosity of about 200-3000 cps.

The film forming polymer in the coating composition suitably has a K-Value of about 5 to about 100, preferably about 10 to about 70.

Colloidal silica, e.g. amorphous colloidal silica particles, may be included. Such silica particles have a small particle size range, e.g. 20-150 nm. Preferred colloidal silicas are Silcron IJ-25 and IJ-50. Silica gels, e.g. amorphous colloidal silica particles, may also be included. Silica gel particles have a medium size range, e.g., 4-7 microns. A preferred silica gel is Silcron G 100.

The coating composition containing a film forming polymer derived from: (a) a monomer composition (monomer A) comprising at least one functionalized or unfunctionalized acryloyl moiety and at least one lactam moiety, (b) at least one N-vinyl amide monomer (monomer $B_{X1}$), (c) at least one optional cross-linker (monomer $B_{X2}$) and (d) at least one solvent further comprises (e) a binder, (f) a pigment, and (g) a surfactant.

Preferably, the coating composition is comprised of (a+b+c+d) is 5-100%, (e) is 0-90%, (f) is 0 to 90% and (g) is 0 to 5%, by weight.

The coating composition has a solids content of about 15-50% and a viscosity of about 200-30,000 cps.

The inventive film forming polymer finds utility as an additive in compositions suitable in various, non-limiting, applications including adhesives, aerosols, agricultural agents, anti-soil redeposition agents, batteries agents, beverages, biocides, block copolymers, branch/comb copolymers, cementing agents, cleaning agents, coating agents, conductive materials, cosmetic agents, dental agents, decorated pigments, detergents, dispersants, drugs, electronics, encapsulations, foods, hair sprays, household-industrial-institutional, inks and coatings, interlaminate adhesives, lithographic solutions, membrane additive agents, metal working fluids, oilfield agents, paints, paper, paper sizing agents, personal care agents, pharmaceuticals, pigment additives, plasters, plastics, printing, refractive index modifiers, sequestrants, soil release agents, static control agents, and wood-care agents.

The coating compositions can be prepared according to the examples set out below. The examples are presented for purposes of demonstrating, but not limiting, the preparation of the coating compositions of this invention.

EXAMPLES

The following non-limiting examples are provided to illustrate a few of the methods that can be utilized in preparing novel coating compositions for forming toner coatings and inkjet receptive coatings. The examples are presented for purposes of demonstrating, but not limiting, the preparation of the compounds and compositions of this invention.

Example 1

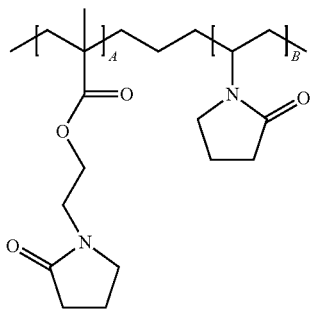

Poly(N-(2-methacryloyloxyethyl)pyrrolidone-co-n-vinyl-2-pyrrolidone) (5/95) Co-Polymer

| | |
|---|---|
| 7.5 g | N-(2-methacryloyloxyethyl)pyrrolidone |
| 142.5 g | N-vinyl-2-pyrrolidone |
| 70 g | Ethanol |
| 280 g | Water |
| 3x 0.45 g | (0.3% to total monomers) Trigonox 121 |

Premix; 7.5 g N-(2-methacryloyloxyethyl)pyrrolidone, 142.5 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 2

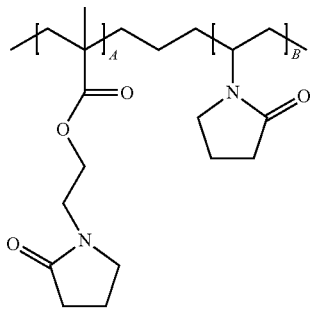

Poly(N-(2-methacryloyloxyethyl)pyrrolidone-co-n-vinyl-2-pyrrolidone) (10/90) Co-Polymer

| | |
|---|---|
| 15 g | N-(2-methacryloyloxyethyl)pyrrolidone |
| 135 g | N-vinyl-2-pyrrolidone |
| 70 g | Ethanol |
| 280 g | Water |
| 3x 0.45 g | (0.3% to total monomers) Trigonox 121 |

Premix; 15 g N-(2-methacryloyloxyethyl)pyrrolidone, 135 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 3

Poly(N-(2-methacryloyloxyethyl)pyrrolidone-co-n-vinyl caprolactam) (10/90) Co-Polymer

| | |
|---|---|
| 15 g | N-(2-methacryloyloxyethyl)pyrrolidone |
| 135 g | N-vinyl caprolactam |
| 70 g | Ethanol |
| 280 g | Water |
| 4x 0.15 g | (0.25% to total monomers) Trigonox C25/75 |

Premix; 15 g N-(2-methacryloyloxyethyl)pyrrolidone, 135 g N-vinyl caprolactam, with 350 g of 80:20 Water/Ethanol and stir 10 mins. Place 10% of this solution (50 g) into reactor as heel charge, and sparge with $N_2$ for 5 mins. Heat reactor containing heel to 65° C. and then initiate with 0.15% Trigonox, then start feed containing 450 g of monomer charge over 6 hrs. Every 2 hours after first initiation, add a booster charge of 0.25% Trigonox for a total of 4 shots of Trigonox over total feed charge of 6 hrs. Hold 1 hr at 75° C. and then cool to 25° C. and discharge clear viscous product. Residual monomers are below <1000 ppm.

Example 4

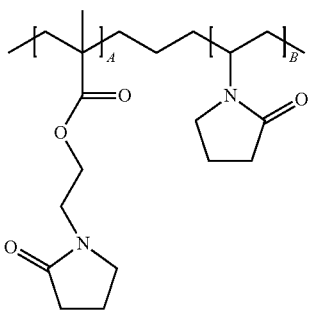

Poly(N-(2-methacryloyloxyethyl)pyrrolidone-co-n-vinyl-2-pyrrolidone) (20/80) Co-Polymer

| | |
|---|---|
| 30 g | N-(2-methacryloyloxyethyl)pyrrolidone |
| 120 g | N-vinyl-2-pyrrolidone |
| 70 g | Ethanol |
| 280 g | Water |
| 3x 0.45 g | (0.3% to total monomers) Trigonox 121 |

Premix; 30 g N-(2-methacryloyloxyethyl)pyrrolidone, 120 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 5

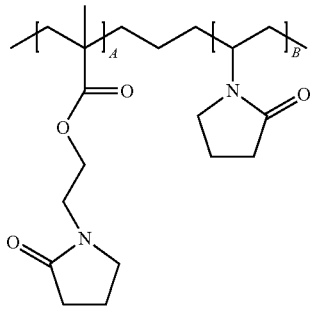

Poly(N-(2-methacryloyloxyethyl)pyrrolidone-co-n-vinyl-2-pyrrolidone) (40/60) Co-Polymer

| | |
|---|---|
| 60 g | N-(2-methacryloyloxyethyl)pyrrolidone |
| 90 g | N-vinyl-2-pyrrolidone |
| 70 g | Ethanol |
| 280 g | Water |
| 3x 0.45 g | (0.3% to total monomers) Trigonox 121 |

Premix; 60 g N-(2-methacryloyloxyethyl)pyrrolidone, 90 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 6

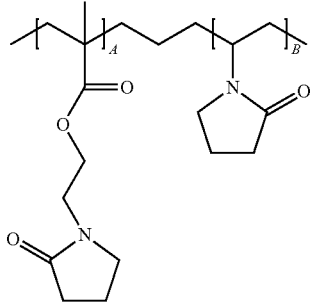

Poly(N-(2-methacryloyloxyethyl)pyrrolidone-co-n-vinyl-2-pyrrolidone) (50/50) Co-Polymer

| | |
|---|---|
| 75 g | N-(2-methacryloyloxyethyl)pyrrolidone |
| 75 g | N-vinyl-2-pyrrolidone |
| 70 g | Ethanol |
| 280 g | Water |
| 3x 0.45 g | (0.3% to total monomers) Trigonox 121 |

Premix; 75 g N-(2-methacryloyloxyethyl)pyrrolidone, 75 g N-vinyl-2-pyrrolidone, with 350 g of 80:20 Water/Ethanol and stir 10 mins. Place 10% of this solution (50 g) into reactor as heel charge, and sparge with N₂ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 7

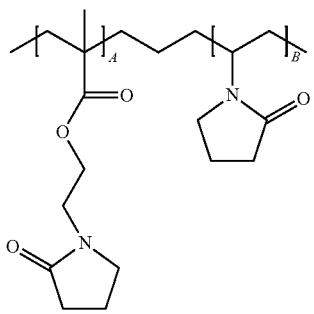

Poly(N-(2-methacryloyloxyethyl)pyrrolidone-co-n-vinyl-2-pyrrolidone) (50/50) Co-Polymer

| | |
|---|---|
| 75 g | N-(2-methacryloyloxyethyl)pyrrolidone |
| 75 g | N-vinyl-2-pyrrolidone |
| 350 g | Ethanol |
| 3x 0.45 g | (0.3% to total monomers) Trigonox 121 |

Premix; 75 g N-(2-methacryloyloxyethyl)pyrrolidone, 75 g N-vinyl-2-pyrrolidone, with 350 g of Ethanol and stir 10 mins. Place 10% of this solution (50 g) into reactor as heel charge, and sparge with N₂ for 5 mins. Heat reactor containing heel to 75° C. and then initiate with 0.3% Trig-121, then start feed containing 450 g of monomer charge over 2 hrs. Every hour after first initiation, add a booster charge of 0.3% Trig-121 for a total of 3 shots of initiator over total feed charge. Hold 1 hr at 75° C. and then cool to 25° C. and discharge clear viscous product.

Example 8

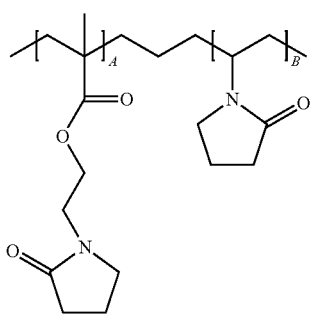

Poly(N-(2-methacryloyloxyethyl)pyrrolidone-co-n-vinyl-2-pyrrolidone) (60/40) Co-Polymer

| | |
|---|---|
| 90 g | N-(2-methacryloyloxyethyl)pyrrolidone |
| 60 g | N-vinyl-2-pyrrolidone |
| 70 g | Ethanol |
| 280 g | Water |
| 3x 0.45 g | (0.3% to total monomers) Trigonox 121 |

Premix; 90 g N-(2-methacryloyloxyethyl)pyrrolidone, 60 g N-vinyl-2-pyrrolidone, with 350 g of 80:20 Water/Ethanol and stir 10 mins. Place 10% of this solution (50 g) into reactor as heel charge, and sparge with N₂ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 9

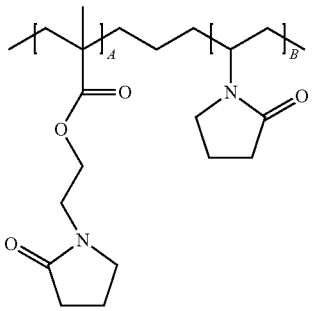

Poly(N-(2-methacryloyloxyethyl)pyrrolidone-co-n-vinyl-2-pyrrolidone) (80/20) Co-Polymer

| | |
|---|---|
| 120 g | N-(2-methacryloyloxyethyl)pyrrolidone |
| 30 g | N-vinyl-2-pyrrolidone |
| 70 g | Ethanol |
| 280 g | Water |
| 3x 0.45 g | (0.3% to total monomers) Trigonox 121 |

Premix; 120 g N-(2-methacryloyloxyethyl)pyrrolidone, 30 g N-vinyl-2-pyrrolidone, with 350 g of 80:20 Water/Ethanol and stir 10 mins. Place 10% of this solution (50 g) into reactor as heel charge, and sparge with N₂ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 10

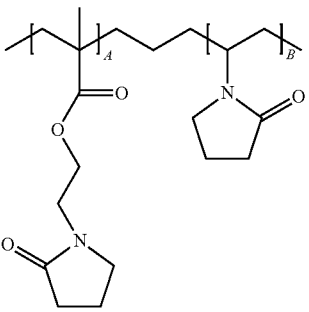

Poly(N-(2-methacryloyloxyethyl)pyrrolidone-co-n-vinyl-2-pyrrolidone) (90/10) Co-Polymer

| | |
|---|---|
| 135 g | N-(2-methacryloyloxyethyl)pyrrolidone |
| 15 g | N-vinyl-2-pyrrolidone |
| 70 g | Ethanol |
| 280 g | Water |
| 3x 0.45 g | (0.3% to total monomers) Trigonox 121 |

Premix; 135 g N-(2-methacryloyloxyethyl)pyrrolidone, 15 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 11

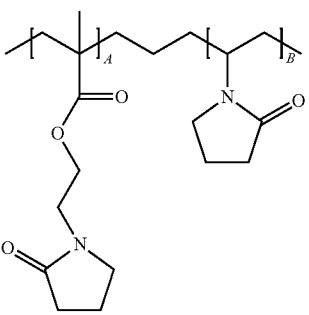

Poly(N-(2-methacryloyloxyethyl)pyrrolidone-co-n-vinyl-2-pyrrolidone) (95/5) Co-Polymer

| | |
|---|---|
| 142.5 g | N-(2-methacryloyloxyethyl)pyrrolidone |
| 7.5 g | N-vinyl-2-pyrrolidone |
| 70 g | Ethanol |
| 280 g | Water |
| 3x 0.45 g | (0.3% to total monomers) Trigonox 121 |

Premix; 142.5 g N-(2-methacryloyloxyethyl)pyrrolidone, 7.5 g N-vinyl-2-pyrrolidone, with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

Example 12

Poly(N-(2-methacryloyloxyethyl)pyrrolidone) Polymer

| | |
|---|---|
| 150 g | N-(2-methacryloyloxyethyl)pyrrolidone |
| 70 g | Ethanol |
| 280 g | Water |
| 3x 0.45 g | (0.3% to total monomers) Trigonox 121 |

Premix; 150 g N-(2-methacryloyloxyethyl)pyrrolidone with 350 g of 80:20 Water/Ethanol and stir 10 mins. Place 10% of this solution (50 g) into reactor as heel charge, and sparge with $N_2$ for 5 mins. Heat reactor containing heel to 80° C. and then initiate with 0.3% Trig-121, then start feed containing 450 g of monomer charge over 6 hrs. Every two hour after first initiation, add a booster charge of 0.3% Trigonox 121 each, for a total of 3 shots of initiator over total feed charge. Hold 2 hr at 85° C. and then cool to 25° C. and discharge clear viscous product. Residual monomers were <1000 ppm.

While a number of embodiments of this invention have been represented, it was apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

What is claimed is:

1. A coating composition for forming a toner or an inkjet receptive coating on a substrate containing a film forming polymer derived from: (a) a monomer comprising at least one functionalized or unfunctionalized acryloyl moiety and at least one lactam moiety, (b) at least one N-vinyl amide monomer, (c) at least one optional cross-linker and (d) at least one solvent (e) a binder, (f) a pigment, and (g) a surfactant, wherein the composition is in the form of an aqueous dispersion having a solids content of about 15-50% and a viscosity of about 200-3000 cps.

* * * * *